United States Patent [19]

Lindgren

[11] Patent Number: 4,829,205
[45] Date of Patent: May 9, 1989

[54] DUAL-ROTARY INDUCTION MOTOR WITH STATIONARY FIELD WINDING

[76] Inventor: Theodore D. Lindgren, 6318 Cherry Hills Rd., Houston, Tex. 77069

[21] Appl. No.: 128,719

[22] Filed: Dec. 4, 1987

[51] Int. Cl.⁴ .......................... H02K 1/22; H02K 16/02
[52] U.S. Cl. .................................... 310/166; 310/114; 310/266; 310/125
[58] Field of Search ............... 310/105, 106, 190, 116, 310/266, 162, 163, 261, 125

[56] References Cited

U.S. PATENT DOCUMENTS

| | | | |
|---|---|---|---|
| 1,933,448 | 10/1933 | Morrill | 310/211 |
| 3,469,124 | 9/1969 | Willcox | 310/266 |
| 3,532,916 | 10/1970 | Fisher | 310/266 |
| 3,939,370 | 2/1976 | Müller | 310/125 |
| 4,146,805 | 3/1979 | Fehr et al. | 310/103 |
| 4,532,448 | 7/1985 | Welburn | 310/163 |
| 4,714,854 | 12/1987 | Oudet | 310/268 |

FOREIGN PATENT DOCUMENTS 1249717 11/1960 France .............................. 310/266

Primary Examiner—Patrick R. Salce
Assistant Examiner—D. L. Rebsch
Attorney, Agent, or Firm—Theodore D. Lindgren

[57] ABSTRACT

An induction-motor structure having a synchronous-rotor and an induction-rotor in which inner- and outer-synchronous-rotor poles and a synchronous-rotor-pole connector surround the inner-cylindrical surface of the hollow cylindrical induction rotor, the outer-cylindrical surface of a hollow cylindrical stator core having alternating-current windings and surround the ends of that induction rotor and that core. At least one of the rotor poles includes magnetic field concentrators. A stationary field winding mounted on the end of the stator may be used adjust power factor.

23 Claims, 2 Drawing Sheets

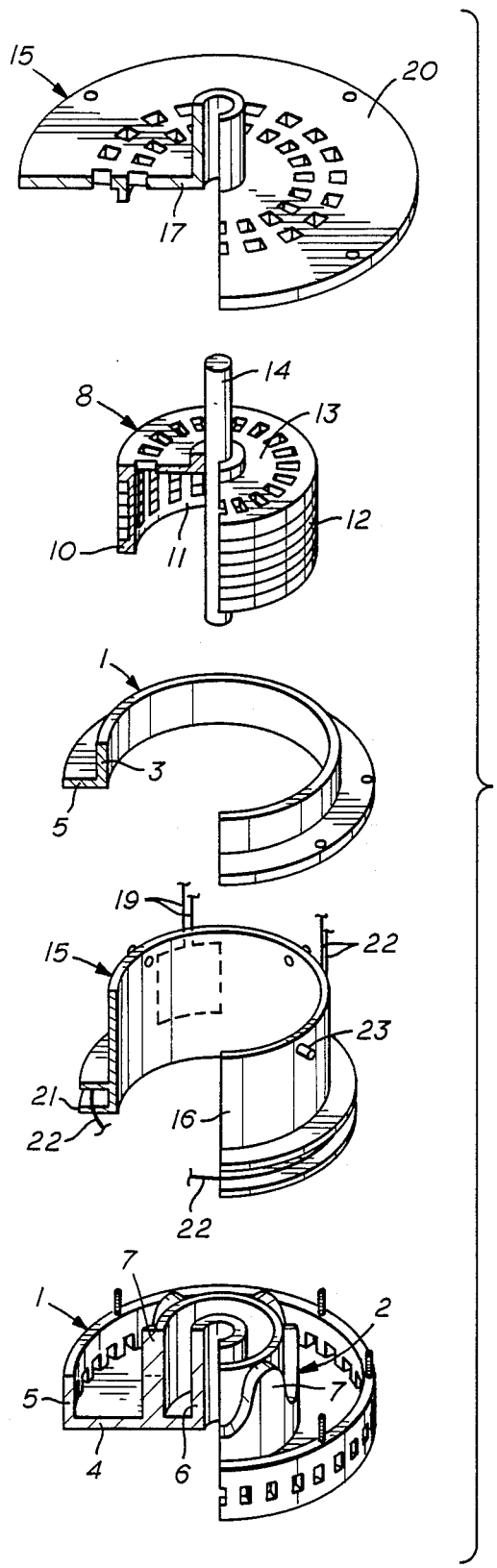
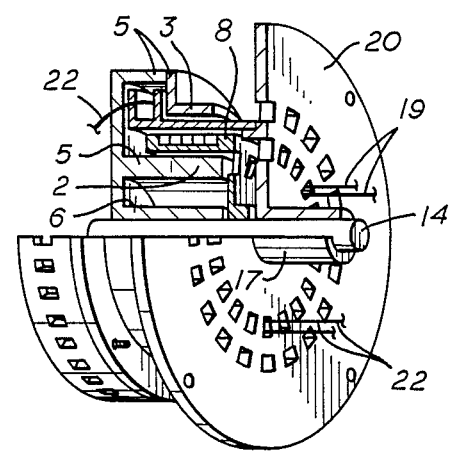
FIG. 3
FIG. 4

DUAL-ROTARY INDUCTION MOTOR WITH STATIONARY FIELD WINDING

RELATED APPLICATIONS

This application is related to United States patent application Ser. No. 07/128,716, Brushless Alternator and Synchronous Motor With Optional Stationary Field Winding; to United States patent application Ser. No. 07/128,718, Transformer and Synchronous Machine With Stationary Field Winding; and to United States patent application Ser. No. 07/128,717, Inductive Torque Transmitter With Stationary Field Winding; all of which were filed by the same inventor on the same date as this application.

BACKGROUND OF THE INVENTION

1. Field of the Invention

This invention is in the field of electrical motor structures and, particularly the field of alternating-current motor structures having induction-type rotors.

2. Description of the Prior Art

Prior-art induction motors are, in commercially successful form, constructed with cylindrical rotors and stators in which hollow, cylindrical, laminated, magnetic cores of the stators surround the cylindrical, laminated, magnetic portions of the rotors. The laminated portions of the rotors typically have squirrel-cage arrays of conductors formed in slots on the outer cylindrical surfaces of the rotors and on the end circumferences of the rotors.

The magnetic fields of conventional induction motors are associated with phased alternating currents and voltages applied to the stators and with phased alternating currents and voltages induced in the rotors as the rotational velocities of the rotors slip with respect to the rotating stator fields. The time-varying magnetic fields associated with the stator and rotor windings typically enter and leave at separate locations both on the inner surface of the laminated stator core and on the outer surface of the laminated rotor, requiring field paths having tangential direction within each of those laminated structures. Therefore, each of the laminated structures must have a radial thickness of sufficient dimension that the combined stator and rotor magnetic flux densities do not saturate while moving in tangential paths within those structures.

Prior-art structures, in general, have limited electromechanical energy transfer capability at high frequencies. One reason for that loss of capability is the inability to compensate for leakage inductance associated with the alternating-current windings.

Hysteresis losses in the laminated prior-art structures, particularly the stator cores, are relatively large because the combined rotor and stator magnetic fields reverse direction at every point in the laminated structures with each cycle of alternating-current and corresponding rotation of the rotors. The hysteresis losses per unit volume would be decreased if the magnetic fields at each point in the stators and rotors did not reverse directions, but varied in only one direction between a minimum value and a maximum value during each cycle, thus avoiding operation involving the major hysteresis loops of the laminated magnetic materials.

Conventional induction motors operate at power factors that are less than ideal. Correction to improve those power factors is accomplished through use of external circuitry and devices that do not minimize the magnitude of current in the stator windings of the machines.

BRIEF SUMMARY OF THE INVENTION

This invention includes a dual-rotor induction motor structure in which inner- and outer-synchronous-rotor poles and a synchronous-rotor-pole connector surround the inner-cylindrical surface of a hollow cylindrical induction-rotor, the outer-cylindrical surface of a hollow cylindrical induction-rotor, the outer-cylindrical surface of a hollow cylindrical stator core, and the ends of the induction-rotor and the stator core. At least one of the rotor poles includes magnetic field concentrators. A plurality of phased alternating-current windings is mounted on the stator core.

Use of an optional stationary field winding attached to the stator core end that is surrounded by the synchronous-rotor permits the voltages and currents in the stator windings of this invention to be adjusted for power factor or for other operating voltage-current criteria. The optional field winding allows use of the machines at higher frequencies because of the added capability to compensate for leakage inductance of the alternating-current windings.

When constructed with ferrous laminated materials, the invention provides an induction-motor structure that is capable of operation with reduced hysteresis energy losses when compared with those of equivalent conventional laminated-core induction motors. The reasons are that time-varying magnetic fields generally pass through the stator core and the induction rotor of the structure without reversing direction and that, if a laminated stator core is used with the structure of this invention, the stator core may generally have the same dimensions or volume as conventional machines designed for similar applications and constructed of similar materials.

BRIEF DESCRIPTION OF THE DRAWINGS

FIG. 3 is an isometric, axially expanded depiction, in partial cross-section, of the invention as embodied with an approximate speed-to-frequency ratio of 10 revolutions per minute per Hertz, with a laminated squirrel-cage induction rotor, with a low-energy-loss stator core, with optional stationary field winding, and with outer pole constructed separately from the remainder of the rotor.

FIG. 4 is a view, in partial cross-section, of the assembled embodiment depicted in FIG. 3.

DETAILED DESCRIPTION OF THE PREFERRED EMBODIMENTS

Figure 1:
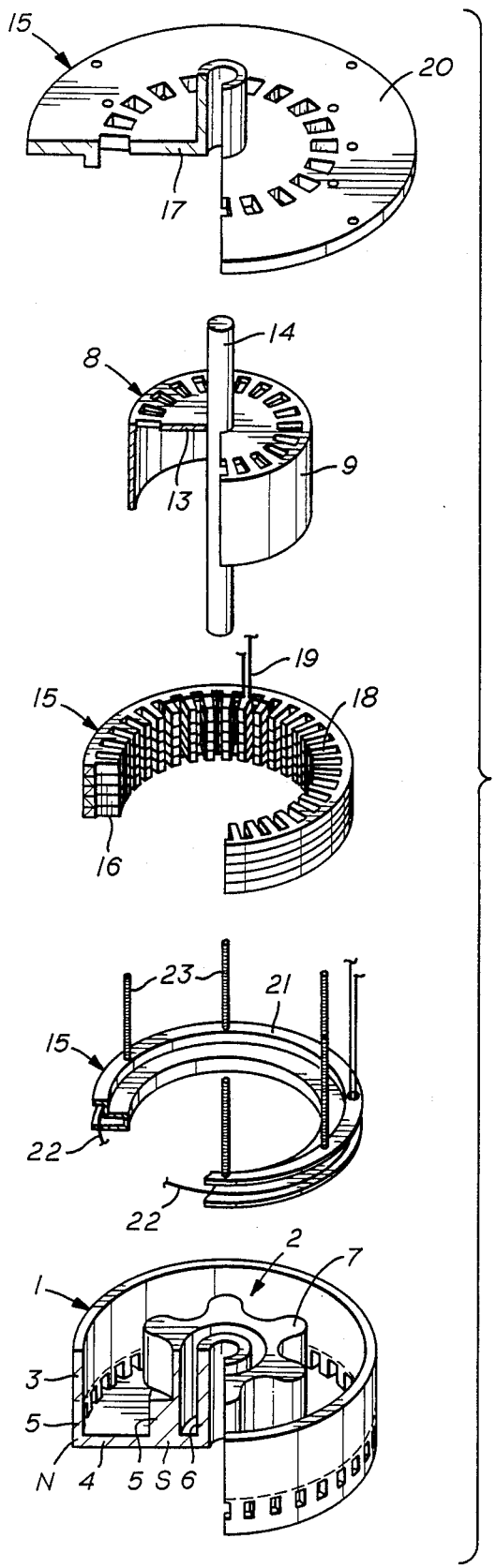
FIG. 1 is an isometric, axially expanded depiction, in partial cross-section, of the invention as embodied with an approximate speed-to-frequency ratio of 10 revolutions per minute per Hertz, with a conductive cylindrical induction rotor, with a laminated stator core, with slots for three-phase windings, and with optional stationary field winding.
Figure 2:
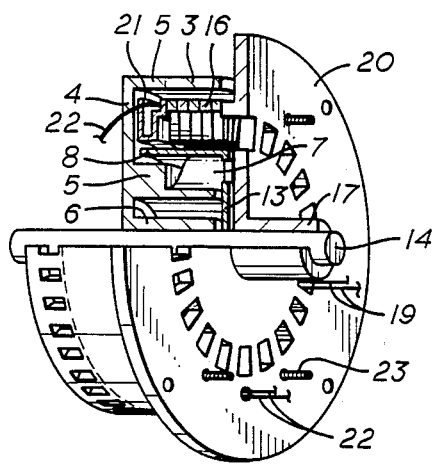
FIG. 2 is a view, in partial cross-section, of the assembled embodiment depicted in FIG. 1.

Referring to FIGS. 1 and 2, synchronous-rotor 1 includes a cylindrical inner-pole member 2 and a cylindrical outer-pole member 3, both pole members 2 and 3 being concentrically attached to, or formed with, annular pole-connecting means 4 such that poles 2 and 3 extend from the same side of connector 4. Synchronous-rotor connector 4 is illustrated in FIGS. 1 and 2 as a disc with, in this embodiment, cylindrical flanges or extensions 5 which attach pole members 2 and 3. Pole members 2 and 3 are fabricated using material having relatively high magnetic permeability. Synchronous connector 4 is fabricated using material having relatively high magnetic permeability in at least that portion, including the disc and extensions 5, between poles 2 and 3. Synchronous-rotor positioning means 6 is illustrated as a hollow shaft concentrically attached to, or formed with, members 2 and 3 and connector 4. As is well-known, synchronous-rotor positioning means 6 may take any of several shaft or journal configurations that accomplish the purpose of maintaining the rotating position of synchronous-rotor means 1 with respect to other parts of the structure. Field concentrator members 7 are illustrated as forming inner pole 2.

Induction-rotor 8, as illustrated in FIGS. 1 and 2, includes hollow cylindrical inductive-means shown as cylinder 9, composed of electrically conductive material having a relatively short radial thickness. In FIGS. 3 and 4, an alternative embodiment of the cylindrical inductive-means is an assembly including squirrel-cage winding 10 formed in slots 11 on one of the cylindrical surfaces and on the end circumferences of hollow laminated induction-rotor core 12. Induction cylinder 9 of FIGS. 1 and 2 and induction-rotor core 12 of FIGS. 3 and 4 are, at one end, attached to or formed with induction-rotor disc member 13 which is, in turn, concentrically attached to, or formed with, induction-rotor positioning means 14, illustrated as a concentrically attached shaft extending from both ends of induction-rotor means 8. As is well-known, induction-rotor positioning means 14 may take any of several shaft or journal configurations that accomplish the purpose of maintaining the rotating position of induction-rotor means 8 with respect to other parts of the structure. The end of induction-rotor shaft 14 opposite induction-rotor disc 13 engages positioning means 6 of synchronous-rotor means 1 such that the outer surfaces of inner pole 2 are separated from the inner-cylindrical surface of induction cylinder 9 or of induction-rotor core 12 by a short air gap and such that disc 13 is at the end of the structure opposite connector 4.

Stator 15 of FIGS. 1, 2, 3 and 4 is shown in three parts in FIG. 1 and in two parts in FIG. 3 and includes hollow cylindrical stator core 16 positioned concentrically by induction-rotor positioning means 14 and concentrically attached stator positioning means 17 such that an air gap exists between the outer-cylindrical surface of either induction cylinder 9 or induction-rotor core 12 and the inner-cylindrical surface of stator core 16. As is well-known, stator positioning means 17 may take any of several shaft or journal configurations that accomplish the purpose of maintaining the position of stator means 15 with respect to other parts of the structure. The axial length of stator core 16 generally defines the axial length of synchronous-rotor poles 2 and 3 for the purposes of this description. Stator core 16 is illustrated in FIGS. 1 and 2 as a high-magnetic-permeability configuration including, as in prior-art machines, layers of sheet steel separated by material having relatively high electrical resistivity. The inner-cylindrical surface of stator core 16 contains slots 18 for stator alternating-current windings 19, only one of which is indicated. Subject to a restriction discussed elsewhere herein, windings 19 are positioned in slots 18 according to methods that are well-known in the prior art pertaining to induction motors. Windings 19 may include insulated conductive or superconductive materials. Slots 18 may be of depth that extends through much of the radial thickness of stator core 16. Stator core 16 is illustrated in FIGS. 3 and 4 as including windings 19 molded in a rigid cylindrical configuration. Optional mounting means 20 may be used to attach stator 15 to a reference structure, not illustrated. As is well-known, reference structures may include custom and standard frames and brackets for attachment to moving and stationary objects of assorted and sundry descriptions.

Optional field excitation is illustrated in FIGS. 1, 2, 3 and 4 as stationary field winding 21 including conductor 22 and attaching means 23 for attachment to stator means 14. Attaching means 23, as shown in FIGS. 1 and 2, also attaches stator core 16 to stator positioning means 17 and to mounting means 20 and, therefore, is not optional. Attaching means 23 may be used to attach stator core 16 directly to a reference structure that includes stator positioning means 17. Alternatively, optional field excitation may be provided by forming connector 4 of material that is permanently magnetized in the radial direction as indicated by North pole "N" and South pole "S" in FIG. 1.

During operation of the illustrated devices a preferably balanced-phase, alternating-current energy source is connected, as in prior-art machines, to stator windings 19. A direct-current energy source may be connected to conductor 22 of field winding 21. The currents in field winding 21, cylindrical inductive-means of induction rotor 8, and stator windings 19 produce magnetic fields that extend through paths consisting of inner and outer poles 2 and 3, synchronous-rotor connector 4 including extensions 5, stator core 16, cylindrical inductive-means of induction rotor 8, and the air gaps between. The magnetic flux in stator core 16 is concentrated in the areas adjacent to concentrators 7. As synchronous-rotor means 1 turns, the change in total magnetic flux passing though a stator winding 19 will be a maximum at the point in time that a rotating concentrator 7 is approximately centered with respect to a slot 18 holding one conductor of that winding 19. Similarly, the change in total magnetic flux decreases to a minimum at the point in time that a rotating concentrator 7 is approximately centered between any two slots 18, each containing a conductor of a stator winding 19 or a conductor of a neighboring winding having the same phase assignment.

Synchronous-rotor means 1 rotates at the synchronous speed determined by the frequency of the alternating-current energy source and the number of concentrators 7. Induction-rotor means 8 rotates at slightly less than synchronous speed when mechanical energy is being transmitted to the shaft of induction-rotor means 8. The slippage with respect to the synchronous rotating magnetic fields induces currents which provide rotational torque in conductive cylinder 9 of FIG. 1 or in squirrel-cage winding 10 of FIG. 3.

During operation, the current in field winding 21 may be adjusted to vary the power factor or phase angle between the voltage and current in stator windings 19 or to otherwise adjust the voltage-current relationship during changes in operating speed, frequency or load.

Torque may be transmitted to a mechanical load from any part of induction-rotor 8. For example, a belt pulley for torque transmission may be attached to an end of shaft 14 or may be formed with induction-rotor 8.

Field concentrators 7 of synchronous-rotor 1 are indicated in FIGS. 1 and 2 as being shaped with non-uniform-length air gaps between the outer surfaces of each concentrator 7 and the inner-cylindrical surface of induction-rotor 8. The shapes of concentrators 7 may be sinusoidal, as illustrated in FIGS. 3 and 4, or may be half-wave sinusoidal with uniform air gaps, although those configurations should not ordinarily be used with a cylindrical inductive-means such as cylinder 9 of FIGS. 1 and 2 because of the resulting concentrations of current in cylinder 9 and the possibly excessive heat generated thereby. Prior-art sinusoidal, half-wave sinusoidal, and other type concentrators are illustrated in my co-pending United States patent application Ser. No. 07/128,716 referenced above. The shapes of concentrators 7 described above are known in the prior art and should generally be fabricated to produce an air-gap magnetic-flux distribution that is offset sinusoidal as a function of angle, assuming that the machine is to be used with sinusoidal alternating-current sources of energy. Each concentrator 7 may be formed to have increased thickness at the end near synchronous-rotor connector 4 to provide improved structural integrity and to provide more uniform magnetic flux density throughout each such concentrator 7.

The number of concentrators 7 used is dependent upon the speed-frequency relation desired for a particular application. The ratio of the rotational speed of synchronous-rotor 1, measured in revolutions per minute, to energy-source frequency measured in Hertz, is equal to sixty divided by the total number of concentrators 7 on a pole 2 or 3. The rotational speed of induction-rotor 8 is normally slightly less than the rotational speed of synchronous-rotor 1, which is the synchronous rotational speed of the field associated with phased windings 19 on stator 15.

Concentrators 7 may be included in either or both inner and outer synchronous-rotor poles 2 and 3. Slots 18 for stator windings 19 may be positioned on the inner or outer surface of stator core 16, but should generally be placed on the surface closest to a pole 2 or 3 having concentrators 7. If concentrators 7 are used for both poles 2 and 3, concentrators 7 should be paired along the same radii if the design objective is to minimize the radial thickness of stator core 16 and thereby maximize electromechanical energy transfer efficiency. Use of concentrators 7 on only one of poles 2 and 3 will, during start-up, increase the total eddy-current flow in the electrically conductive cylindrical pole 2 or 3 without concentrators 7 and will assist in causing synchronous-rotor 1 to reach synchronous speed. Generally, a pole 2 or 3 lacking concentrators 7 or having enclosed-bar-type concentrators 7 should be located on the outer radius of synchronous-rotor 1 to minimize radiation of energy at frequencies that may cause interference with operation of any nearby electronic equipment.

Operation of the motor will cause positively and negatively charged regions in the inner and outer portions of poles 2 and 3 and of connector 4 because the magnetic fields associated with windings 19 and 21 do not rotate. For applications at usual rotational speeds, the electric fields associated with those charges may be ignored.

Synchronous-rotor connector 4 may include spokes and extensions 5 may include extensions of those spokes. The design of synchronous-rotor connector 4 depends on the type of concentrators 7 selected as well as the fabrication process used. Connector 4 may serve as a cooling means for stator 15 and induction-rotor 8 by shaping spokes as axial fan blades or by forming inner centrifugal fan blades that discharge air through ventilation holes in outer extension 5 of connector 4. Connector 4 may be thicker at inner radii than at outer radii to maintain a more uniform field density.

Cylinder 9 of induction-rotor 8, as illustrated in FIGS. 1 and 2, should have a relatively short radial thickness to minimize the effective total length of the air gaps. Field winding 21 may be used to increase the magnetic flux to compensate for the adverse effect of the effective increase in air gap length. In addition, the effective total length of the air gaps may be decreased by use of a cylinder 9 composed of material that is both conductive and has a relatively high magnetic permeability. The length of cylinder 9 and the shape and number of concentrators 7 should be chosen to avoid unnecessary concentrations of current in cylinder 9. Laminated core 12 of induction-rotor 8, as illustrated in FIGS. 3 and 4, is preferably constructed to have the smallest volume possible without causing magnetic flux density to exceed saturation limitations. For many applications, induction-rotor core 12 may be designed to minimize energy losses and yet allow a highly permeable and generally radial path for magnetic fields through use of a hollow cylindrical structure including layers of thin sheet steel separated by a coating of material having high electrical resistivity. The laminations may be planar in planes defined by the structure cylindrical-coordinate, radial-angular directions, or may be planar in planes generally defined by the structure cylindrical-coordinate, radial-axial directions. The axial coordinate of the structure is defined to coincide with the center of shaft 6. As one of many construction alternatives, the squirrel-cage winding 10 may be cast or otherwise formed to provide structural means for holding arc-like segments of laminated sheet steel together to form core 12 such that slots 11 have openings on both inner and outer surfaces of core 12.

Stator core 16 is also preferably constructed to have the smallest volume possible without causing magnetic flux density to exceed saturation limitations. For usual applications, stator core 16 may also be designed to minimize energy losses and yet allow a highly permeable and generally radial path for magnetic fields through use of a conventional laminated structure including layers of thin sheet steel separated by material having high electrical resistivity. The sheet steel should have minimal residual magnetism. The laminations may also be planar in planes defined by cylindrical-coordinate, radial-angular directions, or may be planar in planes generally defined by cylindrical-coordinate, radial-axial directions.

Where more than one concentrator 7 is used, windings 19 should span one-half of the angular distance between identical points on concentrators 7. At the end of stator 16 adjacent to synchronous-rotor connector 4, each winding 19 should, as a general rule, be consistently directed either clockwise or counterclockwise. The general rule applies to two-phase machines if those machines are treated as having four phases. That is, one-half of the connector-end segments of the windings of each of the two phases should be directed clockwise, the other half directed counterclockwise, resulting in the same four-phase configuration that complies with the general rule.

While only one such winding 19 is indicated in FIGS. 1 and 3 for illustration purposes, multiple phased windings should be used, subject to the restriction discussed above, according to the various techniques that are well known in the art. The known design techniques involve several factors, including the number of phases of and the magnitudes of the operating voltages and currents, the maximum magnetic flux density and corresponding stator core 16 dimensions, the conductivity of the winding material, the number of series or parallel connections for windings 19, and the shape of concentrators 7.

Stator core 16 and the cylindrical inductive-means of induction-rotor 8 preferably should be constructed to provide high reluctance to tangentially directed magnetic fields. That high reluctance may, for example, be accomplished by constructing slots 18 and 11 to extend through or nearly through the radial thicknesses of the cores 16 and 12. Laminations that are planar in the cylindrical-coordinate, radial-axial directions may also be used to increase reluctance in the tangential direction. Cylinder 9 of FIG. 1 may also be constructed with strips of insulated magnetic material embedded in and extending over much of the length of the cylindrical surface.

In manner similar to that used for construction of prior-art machines, windings 19 should be positioned to produce fields from phased currents that cause a combined magnetic field having constant rotational magnitude. Also as known from prior-art machine design, energy losses in the synchronous rotor 1 of FIGS. 3 and 4 will be minimized by reasonably narrowing the width of the slot 11 openings at the inner surface of the induction rotor core 12 illustrated in FIG. 3 and 4. Narrowing the width of slot 11 openings will, of course, increase the leakage inductance of winding 10.

For applications in which eddy-current and hysteresis losses cannot be tolerated or in which magnetic flux density saturation is a problem, stator core 16 may include windings 19 molded in a rigid cylindrical configuration using ferrous composite material or using nonferrous, non-conductive material as illustrated in FIGS. 3 and 4. If non-ferrous material is used, the cylindrical configuration should have a short radial thickness in order to minimize the distance between inner and outer synchronous rotor-poles 2 and 3. Because of the relatively short radial thickness, rotor means 1 may be constructed in parts that assemble and disassemble to allow space for and access to field winding 21, also as illustrated in FIGS. 3 and 4 in which outer pole 3 is detachable. Certain ranges of operation characteristics may be further extended by using a non-ferrous induction rotor core 9 as described above.

When compared to equivalent conventional stator cores constructed of similar materials and having similar speed, frequency and electrical specifications, stator core 16 of FIGS. 1 and 2 may require either twice the number of turns in each winding 19 or twice the axial length, assuming that the same maximum magnetic flux density occurs in stator core 16. Other compensatory design factors may be used, such as an increase in both inner and outer radii of core 16. Regardless of the option chosen, if the design objective is to decrease energy losses, and if similar types of windings, air gaps and laminated materials are used, the volume of stator core 16 may generally be the same as that of an equivalent-capacity conventional machine. For example, if the design option chosen calls for increasing the number of turns used in each winding 19 over the number used in a similar conventional machine, the depth of the slots may generally be increased without changing other core dimensions. If the design option chosen is to increase the length of core 16 over the length used in a similar conventional machine, the radial thickness may be decreased to maintain essentially the same volume as the core of the similar conventional machine. Because operation outside of the major hysteresis loop causes lower hysteresis loss per unit volume, construction using the same core volume and material as those of an equivalent conventional machine will result in less total hysteresis loss.

Because the magnetic field in core 16 is primarily radial in direction, core 16 may be fabricated from arc-shaped segments mounted on a suitable cylindrical framework. The arc-shaped segments and windings 19 may be designed for removal and replacement for repair purposes.

Stator means 15 includes a stator positioning means 17 that engages synchronous-rotor positioning means 6 and/or induction-rotor positioning means 14 to position the inner- and outer-cylindrical surfaces of stator core 16 concentrically between the inner surface of outer pole 3 and the outer-cylindrical surface of the cylindrical inductive-means of induction-rotor 8, preferably such that the air gaps between surfaces are consistent in length throughout the gap circumferences. Stator positioning means 17, synchronous-rotor positioning means 6 and induction-rotor positioning means 14 may be of sleeve, ball, roller or other configurations known in the art.

Mounting means 20 may take the form of a housing that surrounds synchronous-rotor means 1 and induction-rotor means 8. Mounting means 20 should, for example, be formed from nonmagnetic material in at least the region extending between inner pole 2 and outer pole 3 or should be constructed such that at least one of the nearest surfaces to poles 2 and 3 is separated from that pole by a relatively long air gap. Stator positioning means 17 may engage shaft 14 at one or more locations.

Optional magnetic field excitation is provided in the embodiments of FIGS. 1, 2, 3 and 4 by field winding 21, which includes insulated electrical conductor 22 and is mounted at the same end of stator core 16 as the end of synchronous-rotor means 1 defined by connector 4. Conductor 22 of winding 21 is preferably positioned at least a short distance from any magnetically permeable part, including stator core 16. Field winding 21 may be attached directly to the end segments of stator windings 19, rather than directly to stator core 16. The two ends of insulated conductor 22 extend from field winding 21 along or through the length of preferably the same slot 18 of stator core 16 to provide a means for connection to a source of direct current, which may be variable in magnitude. In addition to providing a means for adjusting voltage-current relationships such as power factor, the magnetomotive force or magnetic field intensity associated with field winding 21 compensates for the fact that the magnetic flux must pass through a third air gap compared to only two air gaps in conventional machines. The magnitude of current in field winding 21 may be adjusted to increase or decrease the power factor during operation of the motor using a large capacity voltage source or to change other voltage-current operating relationships.

Attaching means 23 attaches stator core 16 to stator positioning means 17 and to either mounting means 20 or a reference structure, not shown. As indicated in FIGS. 1 and 2, attaching means 23 may include bolts extending through slots 18 of stator core 16 and mounting means 20. If bolts 23 extend through the length of core 16, then bolts 23 should preferably be composed of material having a very high electrical resistivity. If the bolts 23 are electrically conductive, they should be insulated from other electrically conductive parts to prevent undesired current flow from voltages induced along their lengths by time-varying magnetic fields that pass through the stator core. To minimize the possibility of undesired current flow, the number of bolts 23 should be equal to the number of concentrators 7 and the bolts 23 should be spaced uniformly around an end circumference of stator core 16. Each of the insulated conducting bolts 23 may be electrically grounded at one end, for example, to mounting means 20 or to a reference structure. The same considerations apply to use of clamps or other devices used for attaching means 23. Attaching means 16 must be of sufficient size, number and material strength such that it will withstand the torque requirements of the structure during operation.

The illustrations and descriptions are intended to describe embodiments of both the invention and components of the invention. The component embodiments, as generally described, are interchangeable among the invention embodiments.

The embodiments described above and indicated in the drawings are illustrative and are not to be interpreted in a limiting sense. Many variations, modifications and substitutions may be made without departing from the scope of the claimed invention. Certain of those variations, modifications and improvements may constitute patentable improvements, yet fall within the claims of this invention.

I claim:

1. An alternating-current, induction-motor structure including a synchronous-rotor, an induction-rotor, and a stator;
   wherein said synchronous rotor includes
   a cylindrical inner-pole member having at least one outer surface,
   a cylindrical outer-pole member having at least one inner surface,
   an annular pole-connecting means to which said pole members are attached concentrically on one side, and
   a concentrically attached synchronous-rotor positioning means;
   wherein said induction-rotor includes
   a hollow cylindrical inductive-means having an inner-cylindrical surface and an outer-cylindrical surface,
   an induction-rotor disc member concentrically attached at one end of said inductive means, and
   a concentrically attached induction-rotor positioning means;
   wherein said stator includes
   a hollow cylindrical stator core having an inner-cylindrical surface and an outer-cylindrical surface,
   a plurality of phased alternating-current windings mounted on said stator core, and
   a concentrically attached stator positioning means for engaging at least one of said synchronous-rotor positioning means and said induction-rotor positioning means;
   wherein one of said cylindrical pole members includes at least one field concentrator member;
   wherein said synchronous-rotor and said induction-rotor are independently, rotatably and concentrically positioned with respect to said stator by said synchronous-rotor positioning means, said induction-rotor positioning means and said stator positioning means such that an air gap is formed between each said outer surface of said inner-pole member and said inner-cylindrical surface of said inductive means, such that an air gap is formed between each said inner surface of said outer-pole member and said outer-cylindrical surface of said stator core, and such that an air gap is formed between said outer-cylindrical surface of said inductive means and said inner-cylindrical surface of said stator core;
   wherein said pole-connecting means and said disc member are at opposite ends of said air gaps; and
   wherein the pole members and at least the portion of said pole-connecting means between said pole members include material having relatively high magnetic permeability.

2. The structure of claim 1 in which said stator means further includes a field winding, wherein said field winding is attached to the end of said cylindrical stator core such that said field winding is located between said pole-connecting means and said core.

3. The structure of claim 1 in which said synchronous-rotor pole-connecting means further includes material that is permanently magnetized in primarily the radial direction.

4. The structure of claim 1 in which said hollow cylindrical inductive-means further includes an electrically conductive hollow cylinder.

5. The structure of claim 1 in which said hollow cylindrical inductive-means further includes a hollow cylindrical laminated steel core on which an electrically conductive squirrel-cage winding is formed.

6. The structure of claim 1 in which said concentrator member is sinusoidally shaped.

7. The structure of claim 1 in which said concentrator member is half-sinusoidally shaped.

8. The structure of claim 1 in which said air gap between said concentrator member and said inductive-means is of non-uniform length.

9. The structure of claim 1 in which said air gap between said concentrator member and said inductive-means is of non-uniform length and said concentrator is a longitudinal bar that is attached to the surface of said cylindrical pole member adjacent to said inductive-means.

10. The structure of claim 1 in which said stator core contains slots for mounting said alternating-current windings and in which said slots extend substantially through the radial thickness of said stator core.

11. The structure of claim 1 in which said stator core includes laminated magnetically permeable material with laminations separated by material having high electrical resistivity, said laminations being planar in planes defined by the structure cylindrical-coordinate, radial-angular directions.

12. The structure of claim 1 in whuch said stator core includes laminated magnetically permeable material with laminations seperated by materials having high electrical resistivity, said laminations being planar in planes generally defined by the structure cylindrical-coordinate, radial-axial directions.

13. The structure of claim 1 in which said stator core includes non-ferrous material molded with said alternating-current windings.

14. The structure of claim 1 in which said stator core includes ferrous composite material molded with said alternating-current windings.

15. The structure of claim 1 in which the end segments of each of said alternating-current windings located adjacent to said pole-connecting means are directed such that balanced positive currents having three or more phases flow in only one of the clockwise or counterclockwise directions, wherein two-phase balanced currents shall be considered as having four phases.

16. The structure of claim 1 including a plurality of bolts extending through the length of said stator core, said bolts being composed of material having high electrical resistivity.

17. The structure of claim 1 including a plurality of bolts extending through the length of said stator core, said bolts being composed of electrically conductive material and said bolts being surronded by material having high electrical resistivity.

18. The structure of claim 1 including a plurality of bolts extending through the length of said stator core, the number of said bolts being equal to the number of said concentrator members and said bolts being uniformly spaced around an end circumference of said stator core.

19. The structure of claim 1 in which said pole-connecting means is an annular disc with concentric cylindrical extensions.

20. The structure of claim 1 in which said pole-connecting means is an annular disc with concentric cylindrical extensions, the outer extension having a plurality of ventilation holes located around its circumference.

21. The structure of claim 1 in which said pole-connecting means includes a plurality of spokes.

22. The structure of claim 1 in which at least one of said pole members is detachable from said pole-connecting means.

23. The structure of claim 1 in which one of said synchronous-rotor positioning means, said induction-rotor positioning means, and said stator positioning means includes a shaft.

* * * * *

UNITED STATES PATENT AND TRADEMARK OFFICE
CERTIFICATE OF CORRECTION

PATENT NO. : 4,829,205

DATED : May 9, 1989

INVENTOR(S) : Theodore D. Lindgren

It is certified that error appears in the above-identified patent and that said Letters Patent is hereby corrected as shown below:

FRONT PAGE [54], "DUAL-ROTARY" should be --DUAL-ROTOR--.

Col. 1, line 1, "DUAL-ROTARY" should be --DUAL-ROTOR--.

Col. 2, lines 9-11, "of a hollow cylindrical induction-rotor, the outer-cylindrical surface" should be deleted.

Col. 10, line 65, "materials" should be --material--.

Col. 10, line 65, "seperated" should be --separated--.

Col. 11, line 22, "surronded" should be --surrounded--.

Signed and Sealed this

Thirtieth Day of January, 1990

Attest:

JEFFREY M. SAMUELS

*Attesting Officer*     *Acting Commissioner of Patents and Trademarks*